(12) United States Patent
Yoshida et al.

(10) Patent No.: US 9,937,506 B2
(45) Date of Patent: Apr. 10, 2018

(54) MOTION GUIDE APPARATUS COOLING NOZZLES, MOTION GUIDE APPARATUS WITH COOLING NOZZLES, AND MOTION GUIDE APPARATUS COOLING SYSTEM

(71) Applicant: THK CO., LTD., Tokyo (JP)

(72) Inventors: Akimasa Yoshida, Tokyo (JP); Ryuji Furusawa, Tokyo (JP); Takuya Horie, Tokyo (JP); Keisuke Nagaike, Tokyo (JP); Shinji Aoki, Tokyo (JP); Ayako Miyajima, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/533,469

(22) PCT Filed: Dec. 15, 2015

(86) PCT No.: PCT/JP2015/085011
§ 371 (c)(1),
(2) Date: Jun. 6, 2017

(87) PCT Pub. No.: WO2016/104233
PCT Pub. Date: Jun. 30, 2016

(65) Prior Publication Data
US 2017/0341092 A1 Nov. 30, 2017

(30) Foreign Application Priority Data
Dec. 25, 2014 (JP) .................................. 2014-262952

(51) Int. Cl.
*F16C 29/04* (2006.01)
*B05B 1/26* (2006.01)
(Continued)

(52) U.S. Cl.
CPC .............. *B05B 1/262* (2013.01); *B05B 1/005* (2013.01); *F16C 29/02* (2013.01); *F16C 29/04* (2013.01); *F16C 37/007* (2013.01)

(58) Field of Classification Search
CPC ................................. F16C 29/02; F16C 29/04
See application file for complete search history.

(56) References Cited

U.S. PATENT DOCUMENTS 9,233,442 B2 * 1/2016 Tullmann ............... B23Q 1/017
2008/0193064 A1 8/2008 Roders
(Continued)

FOREIGN PATENT DOCUMENTS

CN 102032269 A 4/2011
CN 203214611 U 9/2013
(Continued)

OTHER PUBLICATIONS

Office Action dated Jun. 20, 2017, issued in counterpart Taiwanese Application No. 104143804. (3 pages).
(Continued)

*Primary Examiner* — Thomas R Hannon
(74) *Attorney, Agent, or Firm* — Westerman, Hattori, Daniels & Adrian, LLP

(57) ABSTRACT

A motion guide apparatus cooling nozzle is provided which can gas-cool a motion guide apparatus. Cooling nozzles 1a and 1b of the present invention are mounted on a block 4 of the motion guide apparatus to cool at least one of a guide rail 2 and a block 4 that is assembled to the guide rail 2 via a rolling element 6 in such a manner as to be movable relatively. The cooling nozzles 1a and 1b include an inner passage 18 into which gas is introduced, an opening 12a configured to emit a gas flow introduced into the inner passage 18, a deflection surface 22a that is provided adjacently to the opening 12a to bend the gas flow emitted from
(Continued)

the opening 12a, and a guiding surface 32a configured to attract gas outside the cooling nozzles 1a and 1b.

20 Claims, 10 Drawing Sheets

(51) Int. Cl.
  *B05B 1/00* (2006.01)
  *F16C 29/02* (2006.01)
  *F16C 37/00* (2006.01)

(56) References Cited

U.S. PATENT DOCUMENTS

2012/0200178 A1* 8/2012 Kimura .................... H02K 5/02
  310/12.31
2017/0211687 A1* 7/2017 Furusawa ........... F16H 57/0497

FOREIGN PATENT DOCUMENTS

| JP | 2002-372119 A | 12/2002 |
| JP | 2008-544185 A | 12/2008 |
| JP | 2012-233522 A | 11/2012 |
| TW | I298282 B | 7/2008 |
| WO | 2005/077597 A1 | 8/2005 |

OTHER PUBLICATIONS

International Search Report dated Mar. 1, 2016, issued in counterpart application No. PCT/JP2015/085011. (1 page).
Decision to Grant a Patent dated Aug. 30, 2016, Issued in counterpart Japanese Patent Application No. 2014-262952, w/English translation (6 pages).
Office Action dated Dec. 5, 2017, issued in counterpart Chinese Application No. 201580068956.8, with English translation. (8 pages).

* cited by examiner

II-II CROSS-SECTIONAL VIEW

VI-VI CROSS SECTION

ENLARGED VIEW OF PORTION b

VII-VII CROSS SECTION

ENLARGED VIEW OF PORTION b

IX-IX CROSS SECTION

ENLARGED VIEW OF PORTION b

MOTION GUIDE APPARATUS COOLING NOZZLES, MOTION GUIDE APPARATUS WITH COOLING NOZZLES, AND MOTION GUIDE APPARATUS COOLING SYSTEM

TECHNICAL FIELD

The present invention relates to motion guide apparatus cooling nozzles, a motion guide apparatus with cooling nozzles, and a motion guide apparatus cooling system for cooling a motion guide apparatus where a block is assembled to a guide rail via a rolling element in such a manner as to be movable relatively.

BACKGROUND ART

For example, a motion guide apparatus is known which guides the motion of a table of a machine tool. The motion guide apparatus includes a guide rail and a block that is assembled to the guide rail via multiple rolling elements such as balls and rollers in such a manner as to be movable relatively. The table is driven by a drive device such as a ball screw or linear motor. The motion guide apparatus guides the motion of the table. The rolling motion of the rolling elements is used to guide the motion of the table; accordingly, smooth movement of the table can be obtained.

In order to increase rigidity, preload, that is, a load on the rolling elements sandwiched between the guide rail and the block, is applied to the motion guide apparatus. Moreover, a sealing member is mounted on the block. Hence, friction is present in the motion guide apparatus. When the motion guide apparatus is operated under heavy load and/or at high speeds, the motion guide apparatus generates heat due to friction. The heat generation leads to the thermal expansion of the rail and the block to reduce feed accuracy of the table, and results in the thermal expansion of a component to which the rail and the block are attached. The motion guide apparatus needs to be cooled to move the table with high accuracy.

As known motion guide apparatuses, Patent Literature 1 discloses a motion guide apparatus where a coolant groove is formed in a guide rail of the motion guide apparatus, and coolant is supplied into the groove to cool the guide rail. Patent Literature 2 discloses a motion guide apparatus where a coolant passage is formed in a block of the motion guide apparatus, and coolant is supplied into the passage to cool the block.

CITATION LIST

Patent Literature

Patent Literature 1: JP 2008-544185 A
Patent Literature 2: JP 2012-233522 A

SUMMARY OF INVENTION

Technical Problem

However, the known motion guide apparatuses have problems that it is difficult to process the coolant groove and/or passage in the guide rail and/or the block, and that it is necessary to prevent leakage of the coolant and accordingly a sealing mechanism against the leakage is required. If the motion guide apparatus can be air-cooled, these problems can be solved. However, a new problem arises that the cooling efficiency is lower than liquid cooling.

Hence, an object of the present invention is to provide motion guide apparatus cooling nozzles, a motion guide apparatus with cooling nozzles, and a motion guide apparatus cooling system that can gas-cool a motion guide apparatus.

Solution to Problem

One aspect of the present invention solves the object with a motion guide apparatus cooling nozzle for cooling at least one of a guide rail and a block assembled to the guide rail via a rolling element in such a manner as to be movable relatively, and the cooling nozzle includes: an inner passage into which gas is introduced; an opening configured to emit a gas flow introduced into the inner passage; a deflection surface, provided adjacently to the opening, to bend the gas flow emitted from the opening; and a guiding surface configured to attract gas outside the cooling nozzle.

Advantageous Effects of Invention

According to the present invention, the gas flow emitted from the opening of the cooling nozzle is bent along the deflection surface. When the gas flow is bent, a region of low pressure develops on the deflection surface due to the Coanda effect to attract the gas outside the cooling nozzle via the guiding surface. The gas flow attracted via the guiding surface is entrained by the gas flow emitted from the opening. Accordingly, the gas flow emitted from the opening is amplified. The amplified gas flow cools the guide rail and/or the block. Consequently, even gas cooling can cool the motion guide apparatus effectively.

DESCRIPTION OF EMBODIMENTS

An embodiment of cooling nozzles of the present invention is described hereinafter with reference to the accompanying drawings. However, the cooling nozzles of the present invention can be embodied in various forms and are not limited to the embodiment described in the description. The embodiment is provided with the intention of allowing a person skilled in the art to fully understand the scope of the invention by sufficiently disclosing the description.

Figure 1:
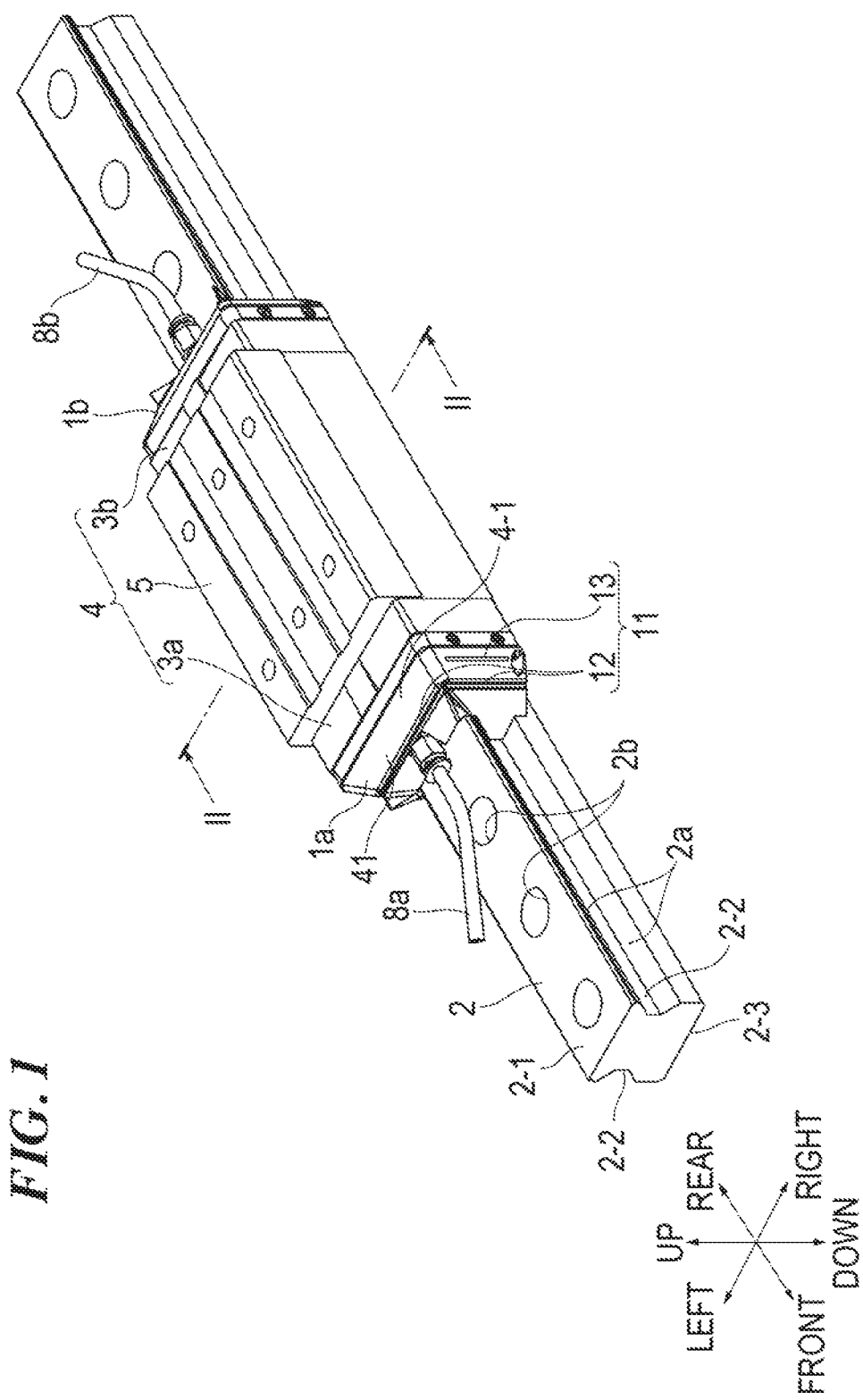
FIG. 1 is a perspective view of a linear guide to which cooling nozzles of an embodiment of the present invention are attached.

FIG. 1 illustrates a perspective view of a linear guide to which cooling nozzles 1a and 1b of the embodiment of the present invention are attached. In the following description, directions of a guide rail 2 placed on a horizontal plane when viewed from a length direction thereof, that is, a left-and-right direction, an up-and-down direction, and a front-and-rear direction, which are illustrated in FIG. 1, are used to describe the configuration of the linear guide. Naturally, the placement of the linear guide is not limited to such left, right, up, down, front, and rear. Moreover, the same reference numerals are assigned to the same configurations throughout the drawings and description.

As illustrated in FIG. 1, the linear guide includes the guide rail 2 that is long in the front-and-rear direction, and a block 4 that is assembled to the guide rail 2 in such a manner as to be movable in the front-and-rear direction. The guide rail 2 and the block 4 of the linear guide are known. A plurality of rolling element rolling portions 2a where rolling elements such as balls or rollers performs rolling motion is formed along the length direction on the guide rail 2. The guide rail 2 includes an upper surface 2-1, a pair of left and right side surfaces 2-2, and a bottom surface 2-3. Bolt insertion holes 2b for attaching the guide rail 2 to a counter component are formed with a fixed pitch in the length direction on the upper surface 2-1 of the guide rail 2.

The block 4 is assembled to the guide rail 2 in such a manner as to straddle the guide rail 2. The block 4 includes a block main body 5, and a pair of end caps 3a and 3b attached to both end surfaces of the block main body 5 in the front-and-rear direction. An option such as an end seal or a lubricant supply device is attached to an end surface of the end caps 3a and 3b when necessary.

Figure 2:
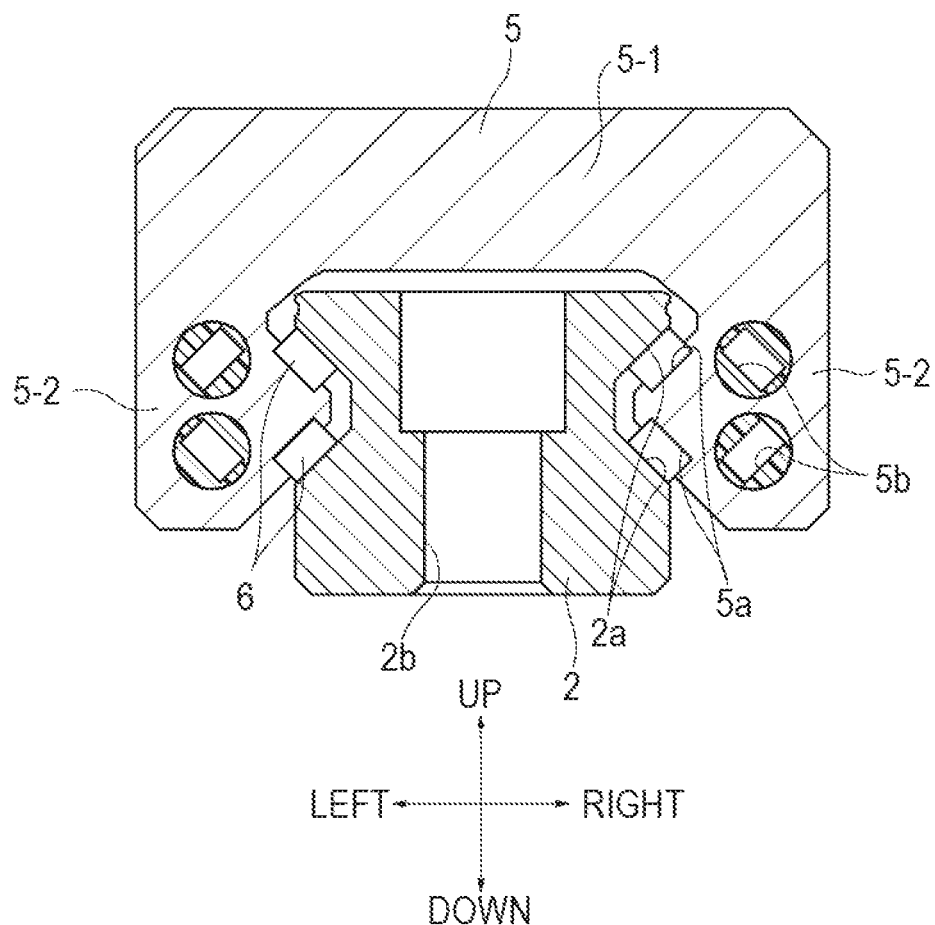
FIG. 2 is a vertical cross-sectional view of the liner guide (a cross-sectional view taken along line II-II of FIG. 1).

FIG. 2 illustrates a cross-sectional view orthogonal to the length direction of the linear guide (a cross-sectional view taken along line II-II of FIG. 1). The block main body 5 includes a center portion 5-1 facing the upper surface 2-1 of the guide rail 2, and a pair of leg portions 5-2 facing the side surface of the guide rail 2. The block main body 5 is formed in a U shape in cross section. Loaded rolling element rolling portions 5a facing the rolling element rolling portion 2a of the guide rail 2, and return paths 5b parallel to the loaded rolling element rolling portion 5a are formed on an inner surface of the block main body 5. A U-shaped turn-around path that connects the loaded rolling element rolling portion 5a and the return path 5b is formed in the end caps 3a and 3b.

A rolling element circulation path includes the loaded rolling element rolling portion 5a, the return path 5b, and a pair of the turn-around paths. The rolling element circulation path houses multiple rolling elements 6. In order to increase the rigidity of the linear guide, the linear guide is preloaded to compress the rolling elements 6 sandwiched between the rolling element rolling portion 2a and the loaded rolling element rolling portion 5a. When the block 4 is moved relatively to the guide rail 2, the rolling elements 6 perform rolling motion between them. The movement of the block 4 is relative to the guide rail 2. The block 4 may move and also the guide rail 2 may move.

As illustrated in FIG. 1, the pair of cooling nozzles 1a and 1b is attached to both end surfaces of the block 4 in the front-and-rear direction. The cooling nozzles 1a and 1b include an opening 11. Airflows are blown out of the openings 11 to cool the guide rail 2 and the block 4. The opening 11 is placed not in an inner surface, which faces the guide rail 2, of the cooling nozzles 1a and 1b but in an outer surface 41 of the cooling nozzles 1a and 1b. The cooling nozzles 1a and 1b are connected to tubes 8a and 8b that supply compressed air to the cooling nozzles 1a and 1b. The other end of the tubes 8a and 8b is connected to a compression machine such as a compressor via a pressure control valve such as a pressure reducing valve. The compressed air whose pressure has been controlled is supplied to the cooling nozzles 1a and 1b.

One cooling nozzle 1a includes a guide rail-specific opening 12 for cooling the guide rail 2, and block-specific openings 13 for cooling the block 4. The cooling nozzle 1a blows airflows toward the guide rail 2 and the block 4 in opposite directions. The other cooling nozzle 1b includes only the guide rail-specific opening 12 for cooling the guide rail 2, and blows airflows only toward the guide rail 2. It is also possible to provide only the guide rail-specific opening 12 to both the cooling nozzles 1a and 1b, or provide the guide rail-specific opening 12 and the block-specific openings 13 to both the cooling nozzles 1a and 1b.

Figure 3:
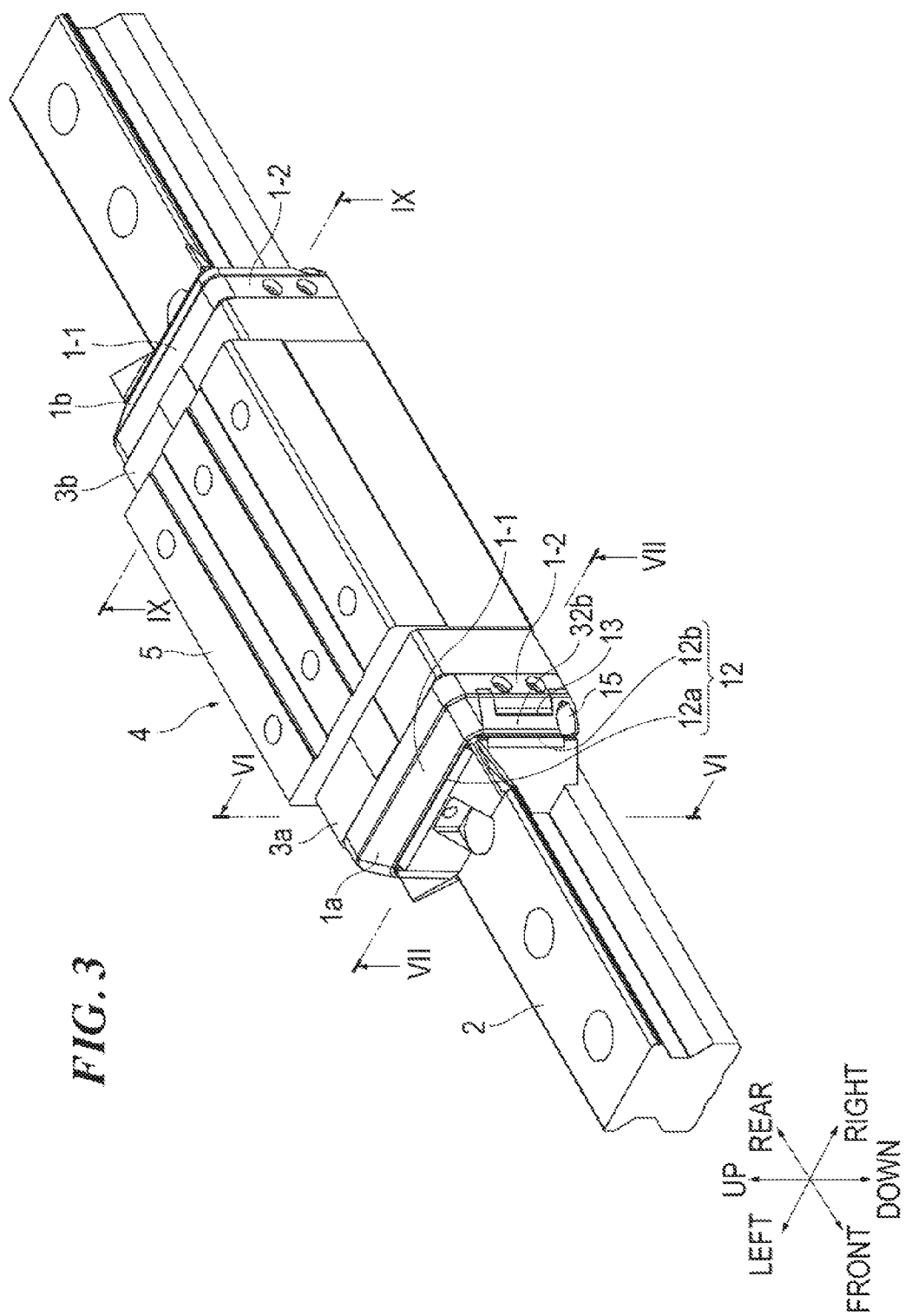
FIG. 3 is a perspective view of the linear guide from which tubes have been removed.
Figure 4:
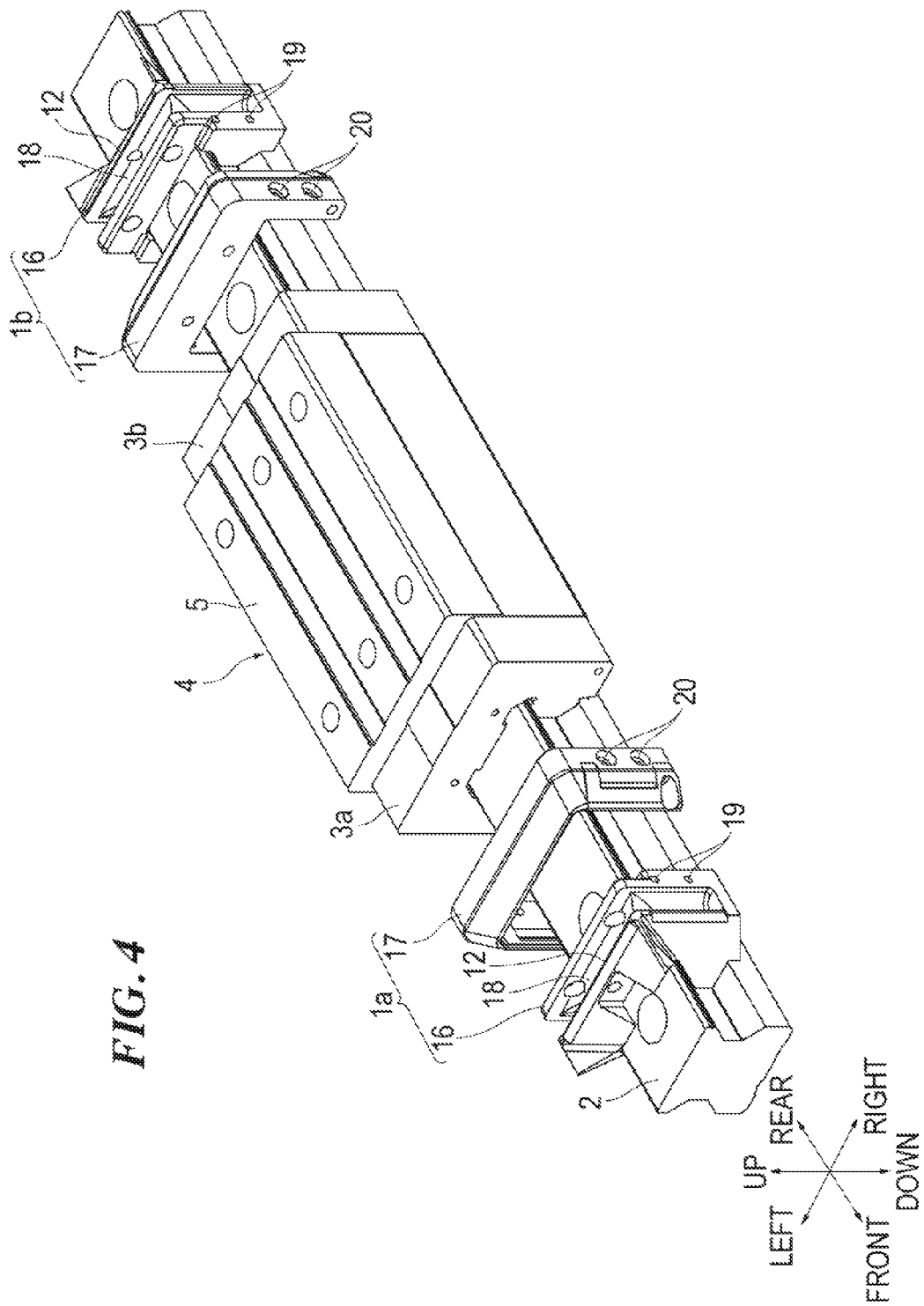
FIG. 4 is an exploded perspective view of the cooling nozzles of FIG. 3.

FIG. 3 illustrates a detailed perspective view of the linear guide from which the tubes have been removed. FIG. 4 illustrates an exploded perspective view of the cooling nozzles 1a and 1b. Firstly, the configuration of the one cooling nozzle 1a is described. As illustrated in FIG. 3, the cooling nozzle 1a has a U shape, including a center portion 1-1 facing the upper surface 2-1 of the guide rail 2, and a pair of leg portions 1-2 facing the side surface 2-2 of the guide rail 2 as in the block 4. The guide rail-specific opening 12 includes an upper side opening 12a placed in the center portion 1-1, and side openings 12b placed in the leg portions 1-2. The block-specific opening 13 is placed only in the leg portion 1-2. A table or the like is attached to an upper surface of the block 4. The block-specific openings 13 are placed in the leg portions 1-2 to enable the cooling of the block 4. The cooling nozzle 1a is attached with fastening members such as screws to the end cap 3a. Through-holes 15 for the fastening members are formed in the cooling nozzle 1a.

As illustrated in FIG. 4, the cooling nozzle 1a includes an inner member 16 that is fitted to the guide rail 2, and an outer member 17 that is fitted to an outer side of the inner member 16. An inner passage 18 into which air is introduced, and the guide rail-specific opening 12 for emitting an airflow toward the guide rail 2 are defined between the inner member 16 and the outer member 17. The inner passage 18 extends long in the left-and-right direction through the center portion 1-1 (see FIG. 3) of the cooling nozzle 1a, bends at both ends in the left-and-right direction, and extends downward through the leg portions 1-2 (see FIG. 3). The inner member 16 and the outer member 17 are made of resin or metal. The inner member 16 and the outer member 17 are joined with fastening members such as screws. Screw holes 19 for threadedly engaging the fastening member are formed in the inner member 16. Through-holes 20 for the fastening members are formed in the outer member 17.

Figure 5C:
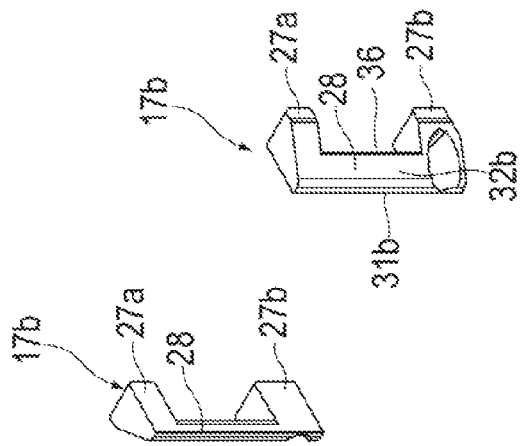
FIGS. 5A to 5C are perspective views of the cooling nozzle (FIG. 5A illustrates an inner member, FIG. 5B illustrates a main body portion of an outer member, and FIG. 5C illustrates insertion bodies).
Figure 5B:
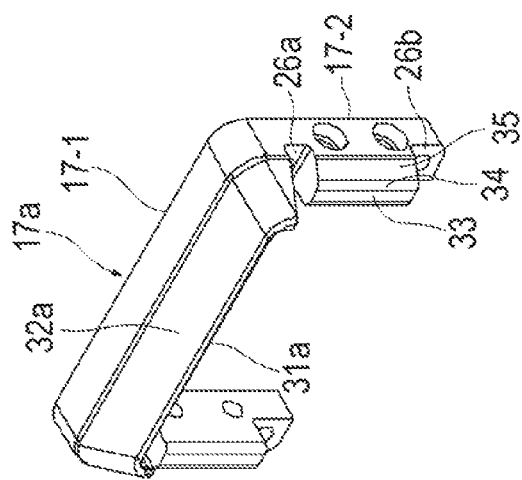
Figure 5A:
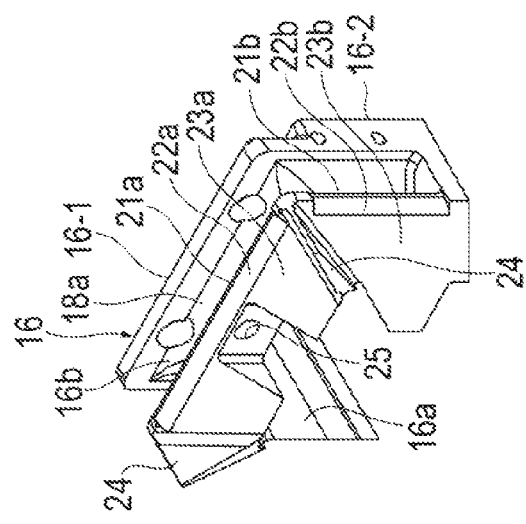

FIG. 5A illustrates a perspective view of the inner member 16. FIGS. 5B and 5C illustrate perspective views of the outer member 17 (the outer member 17 includes a main body portion 17a of FIG. 5B and a pair of insertion bodies 17b of FIG. 5C). As illustrated in FIG. 5A, the inner member 16 has a U shape, including a center portion 16-1 facing the upper surface 2-1 of the guide rail 2, and a pair of leg portions 16-2 facing the side surface 2-2 of the guide rail 2. An inner surface 16a, which faces the guide rail 2, of the inner member 16 is formed in a shape matching an outside shape of the guide rail 2. A groove 18a forming the inner passage 18 is formed on an outer surface 16b, which faces the outer member 17, of the inner member 16.

Guide rail-specific opening forming surfaces 21a and 21b that communicate with the inner passage 18 (details are described below), deflection surfaces 22a and 22b that are adjacent downstream of the guide rail-specific opening forming surfaces 21a and 21b (details are described below), and inclined surfaces 23a and 23b that are adjacent downstream of the deflection surfaces 22a and 22b are further formed on the outer surface 16b of the inner member 16. The inclined surfaces 23a and 23b are flat. The inclined surface 23a or 23b is inclined at an acute angle with respect to the upper surface 2-1 or the side surface 2-2 (see FIG. 1) of the guide rail 2. An intersection portion of the inclined surface 23a of the center portion 16-1 and the inclined surface 23b of the leg portion 16-2 is provided with a baffle plate 24. An introduction port 25 that communicates with the inner passage 18 is formed in the center portion 16-1. The tube 8a is connected to the introduction port 25.

As illustrated in FIGS. 5B and 5C, the outer member 17 includes the main body portion 17a and the pair of insertion bodies 17b that are fitted to the main body portion 17a. The main body portion 17a includes a center portion 17-1 and a pair of leg portions 17-2 as in the inner member 16. The leg portion 17-2 includes depressions 26a and 26b at upper and lower ends thereof. The insertion body 17b includes a pair of upper and lower projections 27a and 27b, and a coupling portion 28 that couples the projections 27a and 27b. The projections 27a and 27b are fitted to the depressions 26a and 26b of the leg portion 17-2. The insertion bodies 17b are fastened together to the main body portion 17a with the fastening members for joining the cooling nozzle 1a to the end cap 3a.

A guide rail-specific opening forming surface 31a facing the guide rail-specific opening forming surface 21a of the inner member 16, and a guiding surface 32a located upstream of the guide rail-specific opening forming surface 31a on an outer side of the main body portion 17a are formed on the center portion 17-1 of the main body portion 17a. The guiding surface 32a is flat. A guide rail-specific opening forming surface 31b facing the guide rail-specific opening forming surface 21b of the inner member 16, and a guiding surface 32b located upstream of the guide rail-specific opening forming surface 31a on an outer side of the insertion body 17b are formed on the insertion body 17b.

The block-specific opening 13 (see FIG. 3) provided in the leg portion 1-2 of the cooling nozzle 1a is configured as follows: As illustrated in FIGS. 5B and 5C, the block-specific opening 13 that emits the airflow toward the block 4 (see FIG. 3) is defined between the main body portion 17a and the insertion body 17b. Block-specific opening forming surfaces 33 that communicate with the inner passage 18 (details are described below), deflection surfaces 34 that are adjacent downstream of the block-specific opening forming surface 33 (details are described below), and inclined surfaces 35 that are adjacent downstream of the deflection surface 34 are formed on the main body portion 17a. The inclined surfaces 35 are flat. A block-specific opening forming surface 36 facing the block-specific opening forming surface 33 of the main body portion 17a, and the guiding surface 32b located upstream of the block-specific opening forming surface 36 on the outer side of the insertion body 17b are formed on the insertion body 17b. The guiding surface 32b also serves as the guiding surface 32b of the side opening 12b (see FIG. 3) and the guiding surface 32b of the block-specific opening 13 (see FIG. 3).

Figure 6A:
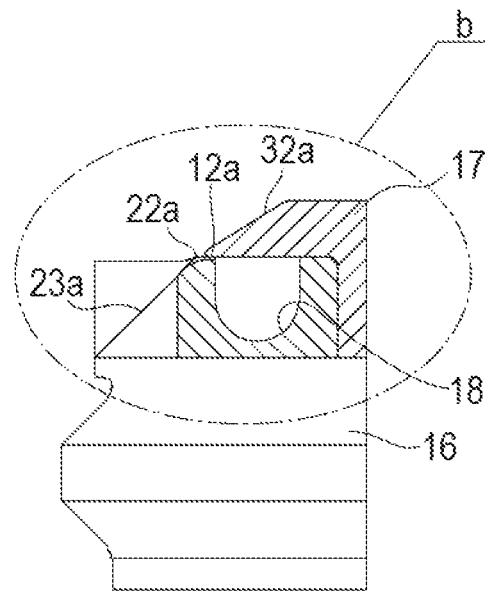
FIGS. 6A and 6B are vertical cross-sectional views of the cooling nozzle (FIG. 6A is a cross-sectional view taken along line VI-VI of FIG. 3, and FIG. 6B is an enlarged view of portion b of FIG. 6A).
Figure 6B:
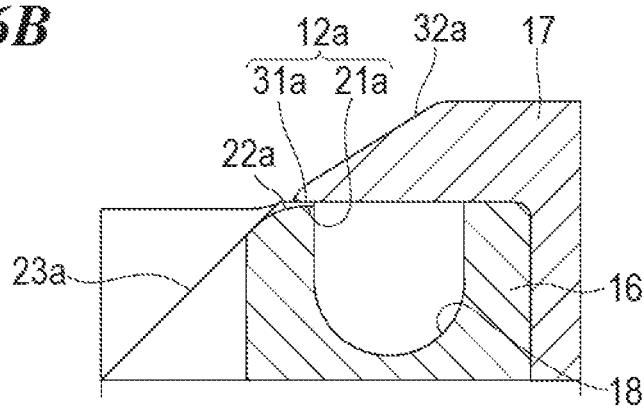

FIG. 6 illustrates a vertical cross-sectional view of the cooling nozzle 1a (a cross sectional view taken along line VI-VI of FIG. 3). FIG. 6B illustrates an enlarged view of portion b of FIG. 6A. As illustrated in FIG. 6B, the upper side opening 12a (see FIG. 3) is defined by the guide rail-specific opening forming surface 21a of the inner member 16 and the guide rail-specific opening forming surface 31a of the outer member 17. The upper side opening 12a communicates with the inner passage 18. The upper side opening 12a comprises a slit whose width between the guide rail-specific opening forming surface 21a and the guide rail-specific opening forming surface 31a is gradually increased from an inlet toward an outlet. The deflection surface 22a is located adjacently downstream of the upper side opening 12a. The deflection surface 22a comprises a curved surface whose cross section is of the shape of an arc. The cross section of the deflection surface 22a can also be formed into a polygonal shape instead of an arc. The deflection surface 22a causes the airflow emitted from the upper side opening 12a to cling to itself to bend the airflow along the surface. When the airflow is bent, a region of low pressure develops on the deflection surface 22a due to the Coanda effect to attract air. The air is attracted along the guiding surface 32a. The attracted airflow is entrained by the gas flow emitted from the upper side opening 12a. The amplified airflow travels toward the upper surface 2-1 of the guide rail 2 along the inclined surface 23a.

Figure 7A:
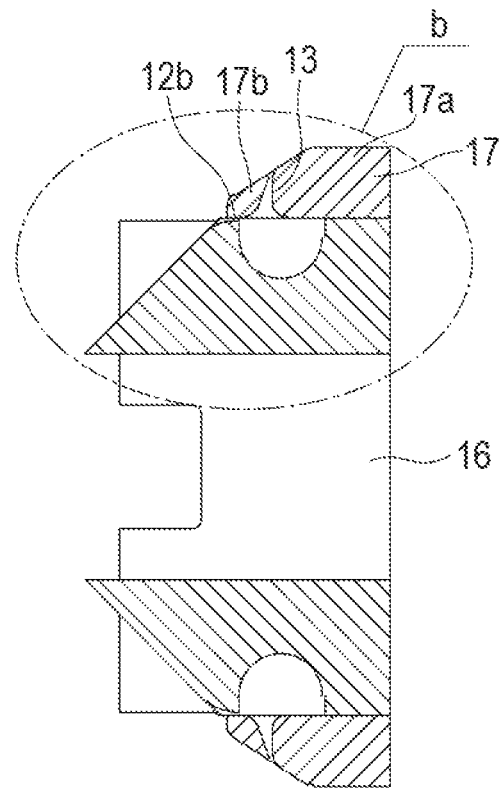
FIGS. 7A and 7B are horizontal cross-sectional views of the cooling nozzle (FIG. 7A is a cross-sectional view taken along line VII-VII of FIG. 3, and FIG. 7B is an enlarged view of portion b of FIG. 7A).

FIG. 7A illustrates a horizontal cross-sectional view of the cooling nozzle 1a (a cross-sectional view taken along line VII-VII of FIG. 3). As illustrated in an enlarged view of portion b of FIG. 7B, the side opening 12b (see FIG. 3) is defined by the guide rail-specific opening forming surface 21b of the inner member 16 and the guide rail-specific opening forming surface 31b of the outer member 17. The deflection surface 22b that bends the airflow emitted from the side opening 12b is located adjacently downstream of the side opening 12b. The guiding surface 32b that attracts air is located adjacently upstream of the side opening 12b. The amplified airflow travels toward the side surface 2-2 of the guide rail 2 along the inclined surface 23b. The baffle plate 24 (see FIG. 5A) separates the airflow emitted from the upper side opening 12a and the airflow emitted from the side opening 12b.

Figure 7B:
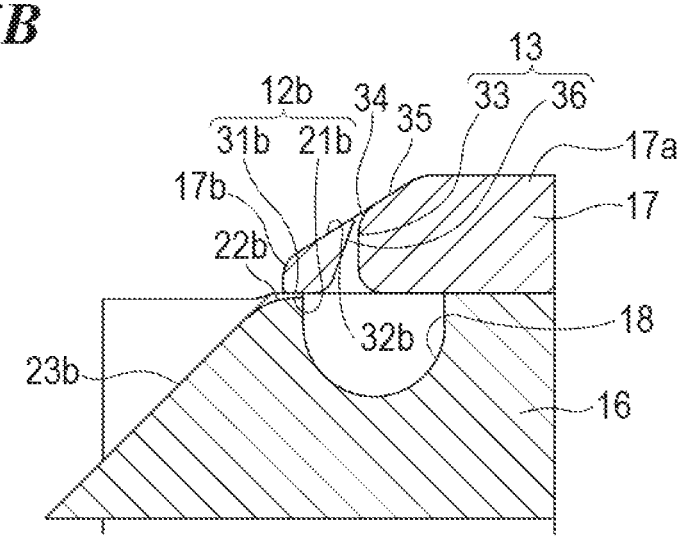

As illustrated in FIG. 7B, the block-specific opening 13 (see FIG. 3) is defined by the block-specific opening forming surface 33 of the main body portion 17a and the block-specific opening forming surface 36 of the insertion body 17b. The block-specific opening 13 communicates with the inner passage 18. The block-specific opening 13 comprises a slit whose width is gradually reduced from an inlet toward an outlet. The deflection surface 34 is located adjacently downstream of the block-specific opening 13. The deflection surface 34 causes the airflow emitted from the block-specific opening 13 to cling to itself to bend the airflow along the surface. When the airflow is bent, a region of low pressure develops on the deflection surface 34 due to the Coanda effect to attract air. The air is attracted along the guiding surface 32b. The attracted airflow is entrained by the gas flow emitted from the block-specific opening 13. The amplified airflow travels toward the side surface of the block 4 along the inclined surface 35.

Figure 8A:
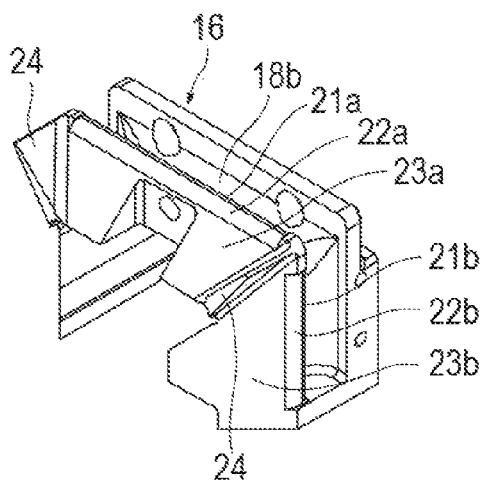
FIGS. 8A and 8B are perspective views of the cooling nozzle (FIG. 8A illustrates the inner member, and FIG. 8B illustrates the outer member).
Figure 8B:
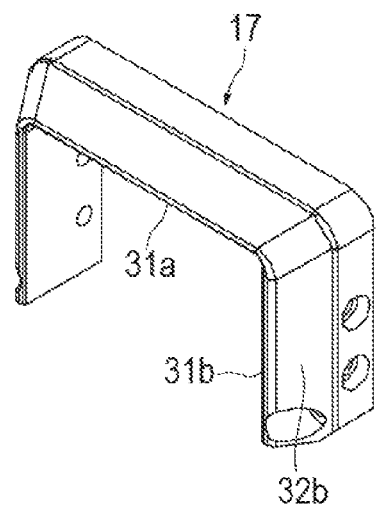

The configuration of the other remaining cooling nozzle 1b is as follows: FIG. 8A illustrates the inner member 16 of the cooling nozzle 1b. FIG. 8B illustrates the outer member 17 of the cooling nozzle 1b. The cooling nozzles 1a and 1b are different in the respect of the presence or absence of the block-specific openings 13. As illustrated in FIG. 8B, the outer member 17 of the cooling nozzle 1b is not provided with the block-specific opening 13. The other configurations are the same as the cooling nozzle 1a. Accordingly, the same reference numerals are assigned and their descriptions are omitted.

Figure 9A:
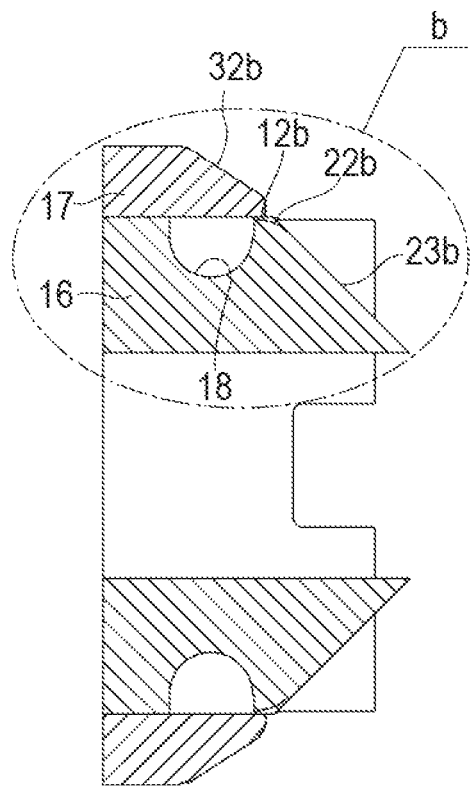
FIGS. 9A and 9B are horizontal cross-sectional views of the cooling nozzle (FIG. 9A is a cross-sectional view taken along line IX-IX of FIG. 3, and FIG. 9B is an enlarged view of portion b of FIG. 9A).
Figure 9B:
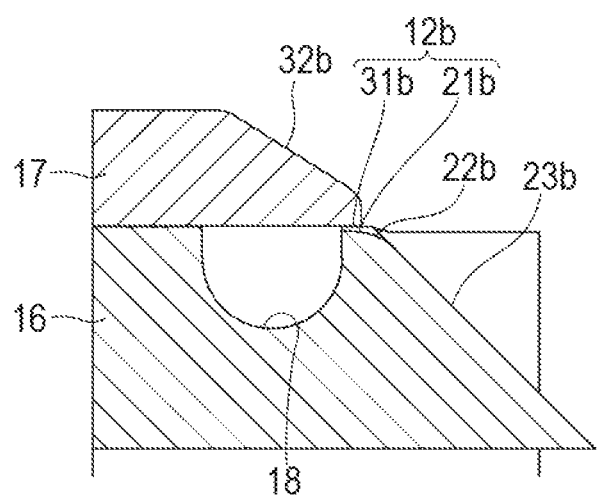

FIG. 9A illustrates a horizontal cross-sectional view of the cooling nozzle 1b (a cross-sectional view taken along line IX-IX of FIG. 3). As illustrated in an enlarged view of portion b of FIG. 9B, the side opening 12b is defined by the guide rail-specific opening forming surface 21b of the inner member 16 and the guide rail-specific opening forming surface 31b of the outer member 17. The deflection surface 22b that bends the airflow emitted from the side opening 12b is located adjacently downstream of the side opening 12b. The inclined surface 23b is located adjacently downstream of the deflection surface 22b. The guiding surface 32b that attracts air to an outer surface of the outer member 17 is located adjacently upstream of the side opening 12b.

The operation of a cooling system is described with reference to FIG. 10. Firstly, the tube 8a is connected to the introduction port 25 of the cooling nozzle 1a. Compressed air is introduced into the introduction port 25 (see (1) INPUT in FIG. 10). The airflow introduced into the introduction port 25 splits in the left-and-right direction in the inner passage 18, and is filled in the inner passage 18 (indicated by a broken line in FIG. 10).

Figure 10:
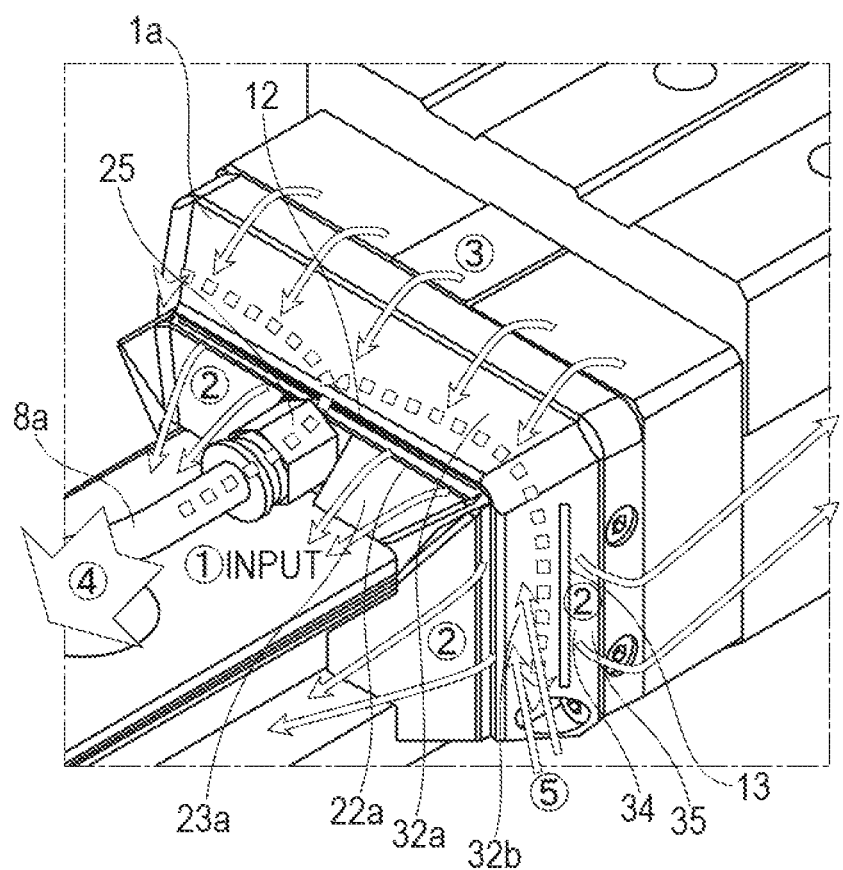
FIG. 10 is a schematic diagram illustrating airflows flowing out of the cooling nozzle.

Next, the airflow enters the guide rail-specific opening 12 and the block-specific openings 13 that are continuous with the inner passage 18, gathers speed, and is emitted as a primary airflow from the guide rail-specific opening 12 and the block-specific openings 13 (see arrows (2) in FIG. 10).

The primary airflow (2) emitted from the guide rail-specific opening 12 is directed onto the deflection surface 22a. The primary airflow (2) flows along the deflection surface 22a and is bent by the deflection surface 22a. A region of low pressure develops on the deflection surface 22a due to the Coanda effect. Accordingly, a secondary airflow indicated by arrows (3) in FIG. 10 is attracted via the guiding surface 32a. The secondary airflow (3) is entrained by the primary airflow (2) to amplify the primary airflow (2). The amplified airflow is indicated by an arrow (4). The amplified airflow (4) is guided to the guide rail 2 along the inclined surface 23a. The amplified airflow (4) cools the guide rail 2. Accordingly, the motion guide apparatus can be effectively cooled even by gas cooling.

The primary airflow (2) exiting from the block-specific opening 13 also flows along the deflection surface 34 and is bent by the deflection surface 34. A region of low pressure develops on the deflection surface 34 due to the Coanda effect. Accordingly, a secondary airflow indicated by arrows (5) in FIG. 10 is attracted via the guiding surface 32b. The secondary airflow (5) is entrained by the primary airflow (2) to amplify the primary airflow (2). The amplified airflow is guided to the block 4 along the inclined surface 35.

The cooling nozzles of the embodiment further exert effects described below. The cooling nozzles 1a and 1b can be easily attached as an option to the block 4. Accordingly, the cooling nozzles 1a and 1b can be used irrespective of the length or kind of the guide rail 2.

The cooling nozzles 1a and 1b are provided with the guide rail-specific opening 12 and the block-specific openings 13. Accordingly, both the guide rail 2 and the block 4 can be cooled.

The openings 12 and 13 of the cooling nozzles 1a and 1b are placed not in the inner surface, which faces the guide rail 2, of the cooling nozzles 1a and 1b but in the outer surface 41 of the cooling nozzles 1a and 1b. Accordingly, it is possible to attract air from a wide space outside the cooling nozzles 1a and 1b, and cause the airflow to intensively hit the guide rail 2.

The guide rail-specific opening 12 includes the upper side opening 12a placed in the center portion 1-1 of the cooling nozzles 1a and 1b, and the side openings 12b placed in the leg portions 1-2. Accordingly, it is possible to blow airflows toward the upper surface 2-1 and the side surfaces 2-2 of the guide rail 2.

The cooling nozzles 1a and 1b include the baffle plates 24 that separate the airflow emitted from the upper side opening 12a and the airflows emitted from the side openings 12b. Accordingly, the airflow emitted from the upper side opening 12a and the airflows emitted from the side openings 12b are mixed. Therefore, it is possible to prevent the airflows from inhibiting each other.

The one cooling nozzle 1a is provided with the guide rail-specific opening 12 and the block-specific openings 13, and the other cooling nozzle 1b is provided with only the guide rail-specific opening 12. Accordingly, cooling efficiency for the guide rail 2 and the block 4 can be increased. If both the cooling nozzles 1a and 1b are provided with the block-specific openings 13, the airflows collide with each other at the center of the block 4 in the front-and-rear direction. However, only the one cooling nozzle 1a is provided with the block-specific openings 13 and accordingly the collision can be avoided. In addition, the airflow blown out of the one cooling nozzle 1a toward the block 4 is entrained by the airflow blown out of the guide rail-specific opening 12 of the other cooling nozzle 1b to be guided to the guide rail 2. Accordingly, the cooling efficiency for the guide rail 2 can be increased.

The motion guide apparatus of the present invention is not limited to the embodiment, and can be embodied in other forms within the scope that does not change the gist of the present invention. In the embodiment, the linear guide is used as the motion guide apparatus, but, for example, a ball spline or ball bushing may also be used.

The configurations of the cooling nozzles of the embodiment are examples. Other configurations can be employed within the scope that does not change the gist of the present invention.

Moreover, in the embodiment, air is used as the gas. However, nitrogen gas, halogen gas, or the like can also be used. A mist of liquid can also be mixed in the airflow.

The present description is based on Japanese Patent Application No. 2014-262952 filed on Dec. 25, 2014, the entire content of which is incorporated herein.

REFERENCE SIGNS LIST 1a, 1b Cooling nozzle
2 Guide rail
2a Rolling element rolling portion
3a, 3b End cap
4 Block
5 Block main body
5a Loaded rolling element rolling portion
5b Return path
6 Rolling element
8a, 8b Tube
11 Opening
12 Guide rail-specific opening (opening)
13 Block-specific opening (opening)
12a Upper side opening (guide rail-specific opening)

12b Side opening (guide rail-specific opening)
16 Inner member
17 Outer member
17a Main body portion
17b Insertion body
18 Inner passage
21a, 21b Guide rail-specific opening forming surface
22a, 22b Deflection surface
23a, 23b Inclined surface
24 Baffle plate
25 Introduction port
31a, 31b Guide rail-specific opening forming surface
32a, 32b Guiding surface
33 Block-specific opening forming surface
34 Deflection surface
35 Inclined surface
36 Block-specific opening forming surface
41 Outer surface of the cooling nozzle

The invention claimed is:

1. A motion guide apparatus cooling nozzle for cooling at least one of a guide rail and a block assembled to the guide rail via a rolling element in such a manner as to be movable relatively, the cooling nozzle comprising:
an inner passage into which gas is introduced;
an opening configured to emit a gas flow introduced into the inner passage;
a deflection surface, provided adjacently to the opening, to bend the gas flow emitted from the opening; and
a guiding surface configured to attract gas outside the cooling nozzle.

2. The motion guide apparatus cooling nozzle according to claim 1, further comprising:
a center portion facing an upper surface of the guide rail; and
a leg portion facing a side of the guide rail, wherein
the opening includes the guide rail-specific opening for cooling the guide rail, and
the guide rail-specific opening includes an upper side opening placed in the center portion, and a side opening placed in the leg portion.

3. The motion guide apparatus cooling nozzle according to claim 2, further comprising a baffle plate configured to separate a gas flow emitted from the upper side opening and a gas flow emitted from the side opening.

4. A motion guide apparatus with a cooling nozzle, comprising:
the motion guide apparatus cooling nozzle according to claim 1; and
the motion guide apparatus.

5. A motion guide apparatus cooling system comprising:
the motion guide apparatus cooling nozzle according to claim 1; and
means configured to introduce gas into the inner passage of the cooling nozzle.

6. The motion guide apparatus cooling nozzle according to claim 1, wherein the cooling nozzle is attached to the block.

7. The motion guide apparatus cooling nozzle according to claim 6, further comprising an inclined surface, provided adjacently to the deflection surface, to guide the gas flow emitted from the opening to at least one of the guide rail and the block.

8. The motion guide apparatus cooling nozzle according to claim 6, further comprising:
a center portion facing an upper surface of the guide rail; and
a leg portion facing a side of the guide rail, wherein
the opening includes the guide rail-specific opening for cooling the guide rail, and
the guide rail-specific opening includes an upper side opening placed in the center portion, and a side opening placed in the leg portion.

9. The motion guide apparatus cooling nozzle according to claim 6, wherein the opening is placed not in an inner surface, which faces the guide rail, of the cooling nozzle but in an outer surface of the cooling nozzle.

10. The motion guide apparatus cooling nozzle according to claim 9, further comprising an inclined surface, provided adjacently to the deflection surface, to guide the gas flow emitted from the opening to at least one of the guide rail and the block.

11. The motion guide apparatus cooling nozzle according to claim 6, wherein the opening includes
a guide rail-specific opening for cooling the guide rail, and
a block-specific opening for cooling the block.

12. The motion guide apparatus cooling nozzle according to claim 11, further comprising an inclined surface, provided adjacently to the deflection surface, to guide the gas flow emitted from the opening to at least one of the guide rail and the block.

13. The motion guide apparatus cooling nozzle according to claim 11, further comprising:
a center portion facing an upper surface of the guide rail; and
a leg portion facing a side of the guide rail, wherein
the opening includes the guide rail-specific opening for cooling the guide rail, and
the guide rail-specific opening includes an upper side opening placed in the center portion, and a side opening placed in the leg portion.

14. The motion guide apparatus cooling nozzle according to claim 11, wherein the opening is placed not in an inner surface, which faces the guide rail, of the cooling nozzle but in an outer surface of the cooling nozzle.

15. The motion guide apparatus cooling nozzle according to claim 14, further comprising an inclined surface, provided adjacently to the deflection surface, to guide the gas flow emitted from the opening to at least one of the guide rail and the block.

16. The motion guide apparatus cooling nozzle according to claim 1, wherein the opening is placed not in an inner surface, which faces the guide rail, of the cooling nozzle but in an outer surface of the cooling nozzle.

17. The motion guide apparatus cooling nozzle according to claim 16, further comprising an inclined surface, provided adjacently to the deflection surface, to guide the gas flow emitted from the opening to at least one of the guide rail and the block.

18. The motion guide apparatus cooling nozzle according to claim 16, further comprising:
a center portion facing an upper surface of the guide rail; and
a leg portion facing a side of the guide rail, wherein
the opening includes the guide rail-specific opening for cooling the guide rail, and
the guide rail-specific opening includes an upper side opening placed in the center portion, and a side opening placed in the leg portion.

19. The motion guide apparatus cooling nozzle according to claim 1, further comprising an inclined surface, provided adjacently to the deflection surface, to guide the gas flow emitted from the opening to at least one of the guide rail and the block.

20. The motion guide apparatus cooling nozzle according to claim 19, further comprising:
   a center portion facing an upper surface of the guide rail; and
   a leg portion facing a side of the guide rail, wherein
   the opening includes the guide rail-specific opening for cooling the guide rail, and
   the guide rail-specific opening includes an upper side opening placed in the center portion, and a side opening placed in the leg portion.

* * * * *